(12) United States Patent
Krack et al.

(10) Patent No.: US 8,310,453 B1
(45) Date of Patent: Nov. 13, 2012

(54) TOUCH-SCREEN SIGN-IN KEY

(75) Inventors: Mike Krack, St. Petersburg, FL (US);
Jai P. Pugalia, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 1423 days.

(21) Appl. No.: 11/866,122

(22) Filed: Oct. 2, 2007

(51) Int. Cl.
*G09G 5/00* (2006.01)
(52) U.S. Cl. ...... 345/173; 345/169; 345/174; 178/18.01
(58) Field of Classification Search .......... 345/156–179; 178/18.01–18.09
See application file for complete search history.

(56) References Cited

U.S. PATENT DOCUMENTS

| | | | |
|---|---|---|---|
| 2008/0015115 A1* | 1/2008 | Guyot-Sionnest et al. | 506/24 |
| 2008/0150906 A1* | 6/2008 | Grivna | 345/173 |
| 2008/0180399 A1* | 7/2008 | Cheng | 345/173 |
| 2009/0085877 A1* | 4/2009 | Chang et al. | 345/173 |

* cited by examiner

*Primary Examiner* — Quan-Zhen Wang
*Assistant Examiner* — Jennifer Nguyen
(74) *Attorney, Agent, or Firm* — Sheridan Ross P.C.

(57) ABSTRACT

The present invention provides methods, devices, and systems for maintaining the security of portable electronic devices. More specifically, the present invention leverages existing touch-screen technology to secure the electronic device. The electronic device may require a user to touch a key having a certain number of contact points to the touch-screen to verify that the user is allowed access to the electronic device or applications supported thereby.

21 Claims, 8 Drawing Sheets

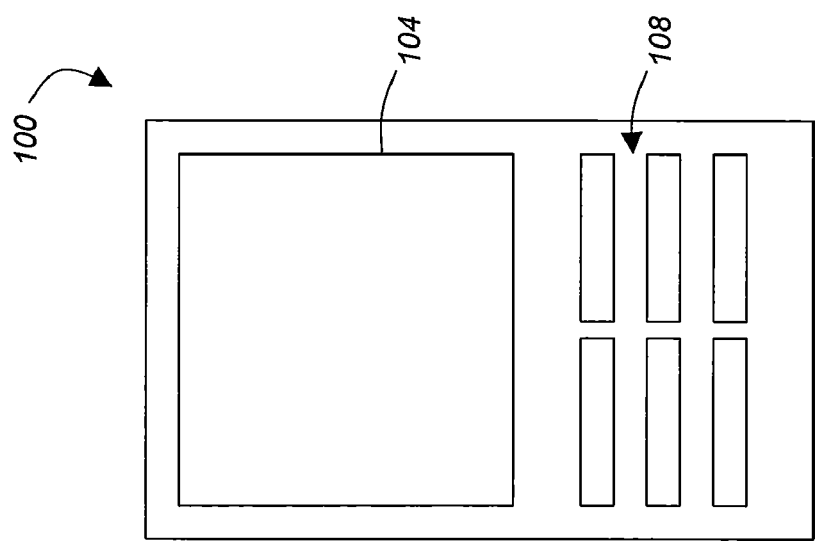

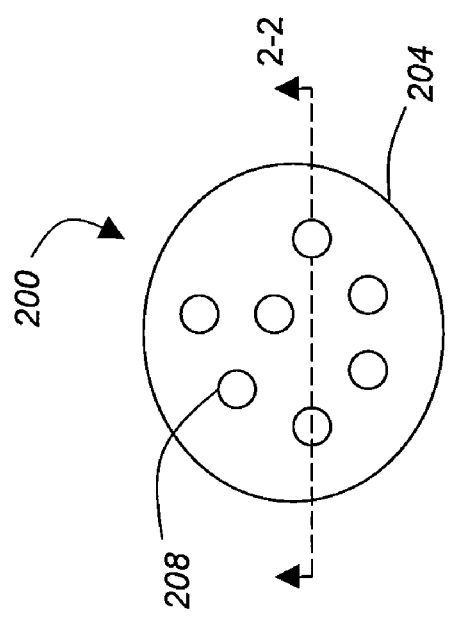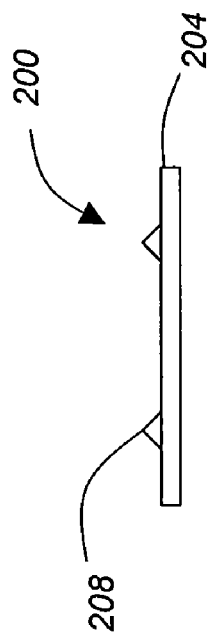

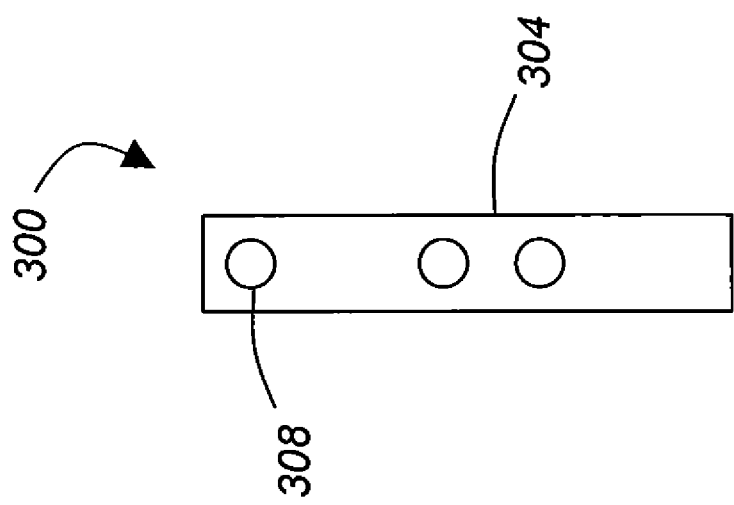

TOUCH-SCREEN SIGN-IN KEY

FIELD OF THE INVENTION

The invention relates generally to security systems and more specifically to security systems for touch-screen electronic devices.

BACKGROUND

Many electronic devices such as Personal Computers (PCs), portable email retrieval devices, cellular phones, Personal Digital Assistants (PDAs), laptops, and other communication devices as well as point-of-sale (e.g., cash registers) systems utilize a touch-screen as a user input device. The popularity of touch-screens has further increased as a result of their increased functionality. More specifically, legacy touch-screen technology reacts to only a single point-of-contact. Now, touch-screen technology recognizes commands that include multiple points-of-contact on the touch-screen.

As electronic devices have become increasingly smaller and capable of providing increased functionality, so too has the need to maintain the security of such electronic devices. Traditionally passwords were used to maintain the security of such electronic devices. While the use of passwords helps to ensure that only licensed users are allowed access to the electronic device and applications stored thereon, the passwords can become cumbersome to enter, especially when the user needs to enter it quickly to access the electronic device (i.e., like when the user is attempting to answer a call to their cellular phone).

The primary means of entering a sign-in password with touch screen devices is via a "stylus pen," where the user is required to enter the password by either pressing keys on a virtual keyboard or using specialized graffiti language. This specialized graffiti language can also tend to take a long time to enter a password. Moreover, passwords on these portable electronic devices tend to be short and weak, given the inconvenience of requiring the user to enter a complex password with current methods.

It would be desirable to provide a portable electronic device that leverages the emerging technology of touch-screen devices as well as the drivers associated therewith to provide a more secure portable electronic device that is also easily accessible.

SUMMARY

These and other needs are addressed by various embodiments and configurations of the present invention. The present invention is directed generally to a system, device, and method for facilitating a touch screen sign-in key. The method generally comprises:

simultaneously detecting a plurality of contact points on a touch-screen of an electronic device, wherein the contact points correspond to contact sensing elements of the touch-screen that have been activated by receiving contact from a sign-in key;

analyzing the plurality of contact points;

determining key information based on the plurality of contact points; and making a determination to admit or deny a user access to the electronic device based on the determined key information.

In accordance with at least some embodiments of the present invention, a sign-in key containing a plurality of pins or contactors laid out in a random order is provided. This sign-in key may be presented to the touch-screen thus creating the contact points. The device touch-screen driver is then operable to recognize the relative orientation of the contact points (i.e., the pattern and configuration of the contact points) and make a determination to either admit or deny a user access to the electronic device and/or applications stored thereon. This low-cost sign-in key may be produced of plastic, metal, composite, or any other type of material suitable for contacting a touch-screen.

This approach of authenticating one's self to an electronic device (e.g., via presenting a sign-in key to a touch-screen of an electronic device) is faster than previously proposed security systems as there is no longer a need to enter a username and password using the touch-screen graffiti language via a stylus, for example. This approach does not lend itself easily to shared password sign-ins and is useful in an environment where many potential users, such as employees of an organization, must sign in to an electronic device each day (e.g., POS cash register type device). In accordance with embodiments of the present invention, each employee may be provided with their own unique key which would have to be physically given to another user. This approach also eliminates the necessity of password reset requests for forgotten passwords.

In accordance with at least some embodiments of the present invention, the use of a sign-in key having a plurality of contactors rather than a password also provides a system with a greater level of security. Many touch-screen passwords tend to be short and weak given the inconvenience of entering a complex password with previous methods. Embodiments of the present invention provide greater security strength that increases exponentially with the number of pins on the key and is limited only by the desired physical size of the key and contact sensitive elements in the touch-screen. For example, a 10 mm square key having pins 2 mm think would permit a grid of 5 pins by 5 pins. If only 10 pins are present of the possible 25 pins, there would be over 3 million possible combinations for these pins. As can be appreciated, if the required size of pins or contactors is decreased or the size of the sign-in key is increased, the password strength can be further increased well beyond 3 million possible contactor combinations.

The use of a sign-in key helps replace the need for both a username and password in a multi-user environment. Auto-identification of users based on the key presented can be quickly and efficiently processed. Accordingly, each user in a multi-user environment may be given a different unique key. However, in accordance with at least some embodiments of the present invention, a number of users may be given the same key thereby giving each of those users the same access privileges to the electronic device. The use of a generic key for certain security levels (e.g., employee, manager, administrator, etc.) helps keep the administration of the security system as simple as possible. Advantages to using a sign-in key versus other identification technologies include the fact that if a key pattern is believed to be compromised/copied, that key can be deactivated and another key can be issued to the same user. In other words, keys can be obsoleted and replaced on a regular basis. Moreover, no additional space is required of the electronic device to be devoted to another security mechanism. Rather, the touch-screen, which is already used for other applications, can be easily leveraged to act as a security system.

In accordance with embodiments of the present invention, key information may include location or spatial information that is determined by the contact points (e.g., where the key contacts the touch-screen). This key information can be determined according to any known spatial and location analysis algorithm known in the security and authentication arts.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 1 is a block diagram depicting a portable electronic device in accordance with at least some embodiments of the present invention;

FIG. 2A is a block diagram depicting a top view of a first key that can be used to access a secure portable electronic device in accordance with at least some embodiments of the present invention;

FIG. 2B is a block diagram depicting a cross-sectional view across line 2-2 of a first key that can be used to access a secure portable electronic device in accordance with at least some embodiments of the present invention;

FIG. 3 is a block diagram depicting a top view of a second key that can be used to access a secure portable electronic device in accordance with at least some embodiments of the present invention;

DETAILED DESCRIPTION

Figure 4B:
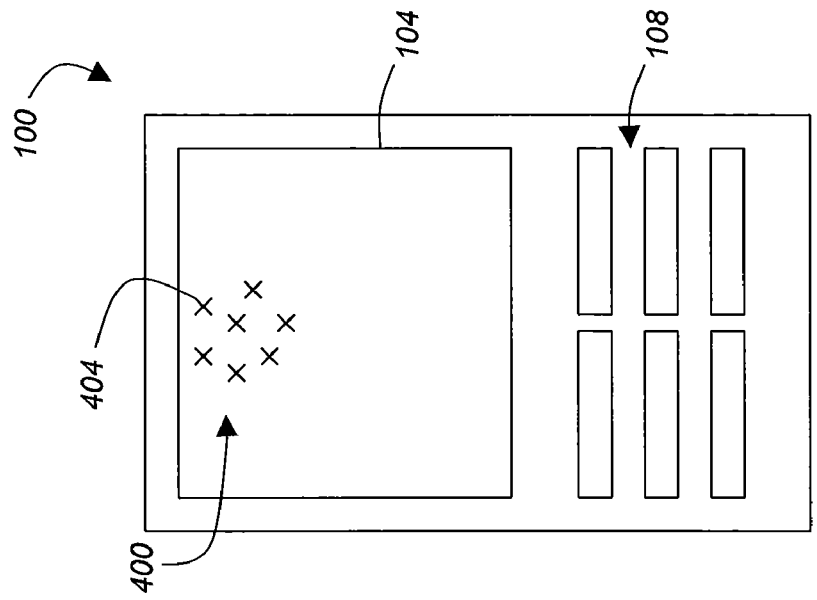
FIG. 4B is a block diagram depicting a second orientation of two-dimensional contact points on a touch-screen in accordance with at least some embodiments of the present invention.

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to maintain the security of portable electronic devices and the like.

The exemplary systems and methods of this invention will also be described in relation to security software, modules, and associated security hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

FIG. 1 is a block diagram depicting a portable electronic device, 100 in accordance with at least some embodiments of the present invention. The electronic device 100 may comprise a touch-screen 104 as well as a keypad 108. The touch-screen 104 may serve as both a user input and user output for the electronic device 100. The keypad 108 may comprise a plurality of keys that are operable to receive user inputs and operate various applications provided by the electronic device 100. The electronic device 100 may comprise any type of processing unit operable to store applications thereon and allow the user to access such applications.

The type of functionality supported by the electronic device 100 may include, for example, communication functionality, word processing functionality, computing functionality, audio listening functionality, and the like. This functionality may be maintained in a secure state (e.g., a user may be denied access) until a valid key is presented to the touch-screen 104 or a user enters a valid password either via the touch-screen 104 or keypad 108.

In accordance with at least some embodiments of the present invention, the touch-screen 104 may comprise a series of contact grids uniformly spaced elements. Each element may be sensitive to contact as an input. In accordance with at least one embodiment of the present invention, the elements may comprise dimensions of about 1 mm by 1 mm. In such an embodiment, the elements may be assigned a 1 mm area and each element may be reactive to simultaneously detect contact. The contact detecting elements of the touch-screen 104 may be of any size and/or shape. As an example, the elements may be circular, rectangular, square, triangular, or any other shape. The greater the granularity of the elements (e.g., the smaller the elements), the more elements that can be fit in the touch-screen 104. If smaller contact detecting elements are used in the touch-screen 104 then there is a possibility to secure the electronic device 100 with a stronger password because more contact points can define a key.

With reference now to FIGS. 2A and 2B, a first key 200 will be described in accordance with at least some embodiments of the present invention. The key 200 may comprise a base 204 having a plurality of contactors 208 located thereon. The contactors 208 of the first key 200 may be in a two-dimensional configuration as can be seen in FIG. 2A. The location of the contactors 208 on the base 204 may be randomly assigned and the size of the contactors 208 may correspond to the size of the contact detecting elements used in the touch-screen 104. In accordance with at least some embodiments of the present invention, each contactor 208 may comprise a first end for connecting to the base 204 and a second end for contacting the touch-screen 104. The contactors 208 may comprise a conical shape whereby the connecting end of the contactor 208 comprises a larger radius that the contacting end of the contactor 208. The contacting end of the contactors 208 may come to a point that is equal to or smaller in size than the contact detecting elements of the touch-screen 104. Of course, various other shapes of contactors 208 may be employed to further secure the electronic device 100. If the proper shape contactor 208 is not detected on the touch-screen 104, then access to the electronic device 100 may be denied. A combination of differently shaped contactors 208 may also be employed on the same key 200 to help maintain the security of the electronic device 100.

With reference now to FIG. 3, a second key 300 will be described in accordance with at least some embodiments of the present invention. The second key 300 is similar to the first key 200 in that it comprises a base 304 and a plurality of contactors 308. The contactors 308 of the second key 300 may be oriented in a one-dimensional fashion. In other words, the contactors 304 of the second key 300 may be randomly located along a common axis whereas the contactors 208 of the first key 200 may be randomly located along a common plane.

Figure 4A:
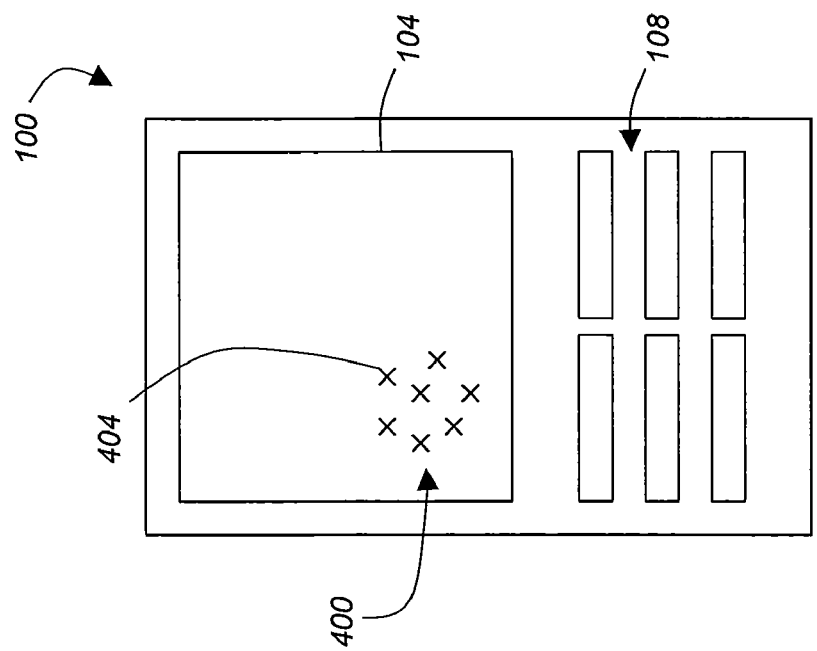
FIG. 4A is a block diagram depicting a first orientation of two-dimensional contact points on a touch-screen in accordance with at least some embodiments of the present invention.
Figure 4D:
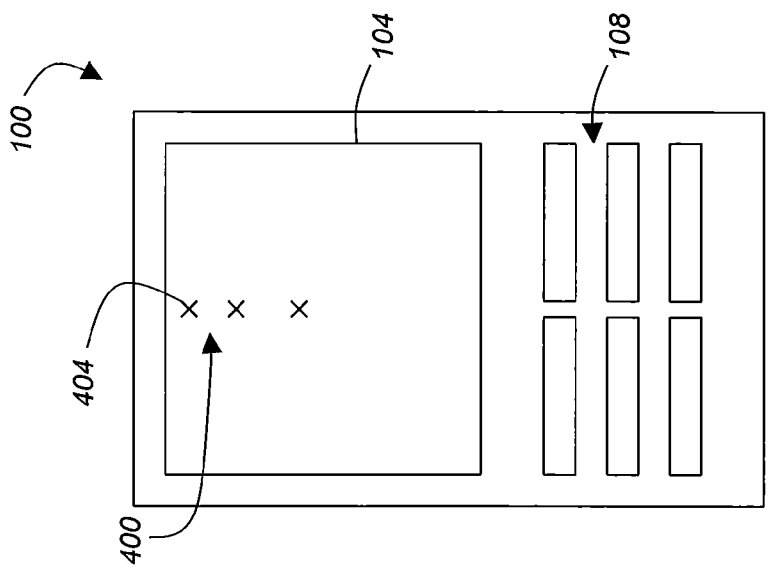
FIG. 4D is a block diagram depicting a second orientation of one-dimensional contact points on a touch-screen in accordance with at least some embodiments of the present invention.
Figure 4C:
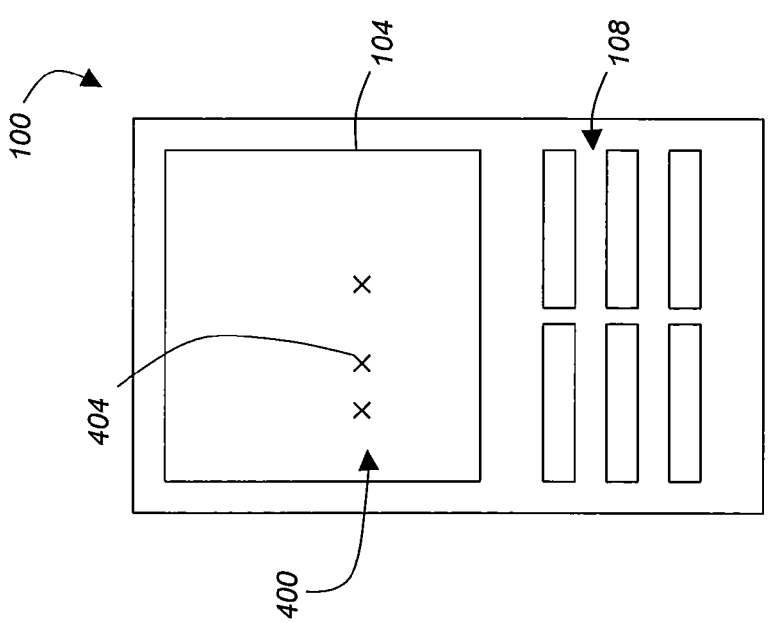
FIG. 4C is a block diagram depicting a first orientation of one-dimensional contact points on a touch-screen in accordance with at least some embodiments of the present invention.

FIGS. 4A-4D depict the various ways that a key 200, 300 can be presented to a touch-screen 104 for a user to activate the electronic device 100 or otherwise gain access to one or more applications stored thereon. The key 200, 300 may be presented to the touch-screen 104 in any location where the touch-screen 204 is sensitive and responsive to multiple simultaneous contact points. As can be seen in FIGS. 4A and 4B, a two-dimensional key 200 may contact the touch-screen 104 at a contact area 400. As can be seen in FIGS. 4C and 4D, the one-dimensional key 300 may be presented to the touch-screen 104 at any location or rotational orientation. Although not depicted, one skilled in the art will also recognize that the two-dimensional key 200 may be presented to the touch-screen 104 in any location and/or rotational orientation.

The contact area 400 may comprise a plurality of contact sensitive elements that are contacted by the contactors 204, 208 of the key 200, 300. These points of contact also referred to herein as contact points 404 are registered by the electronic device 100 to determine if the user presenting the key 200, 300 is allowed access to the electronic device 100 or applications stored thereon. In accordance with at least some embodiments of the present invention, the location of the contact area 400 and contact points 404 on the electronic device 100 is not limited to a particular location on the touch-screen 104 or a particular orientation (i.e., rotational orientation). Rather, the key 200, 300 can be presented to the touch-screen 104 in any location or orientation, thereby making use of the key 200, 300 significantly easier than would otherwise be required if a strict location/orientation were enforced. Of course, however, a certain area on the touch-screen 104 may be designated for multiple point contacts and keyed entry access, in which case the key 200, 300 would have to be presented to the touch-screen in the designated area.

Figure 5:
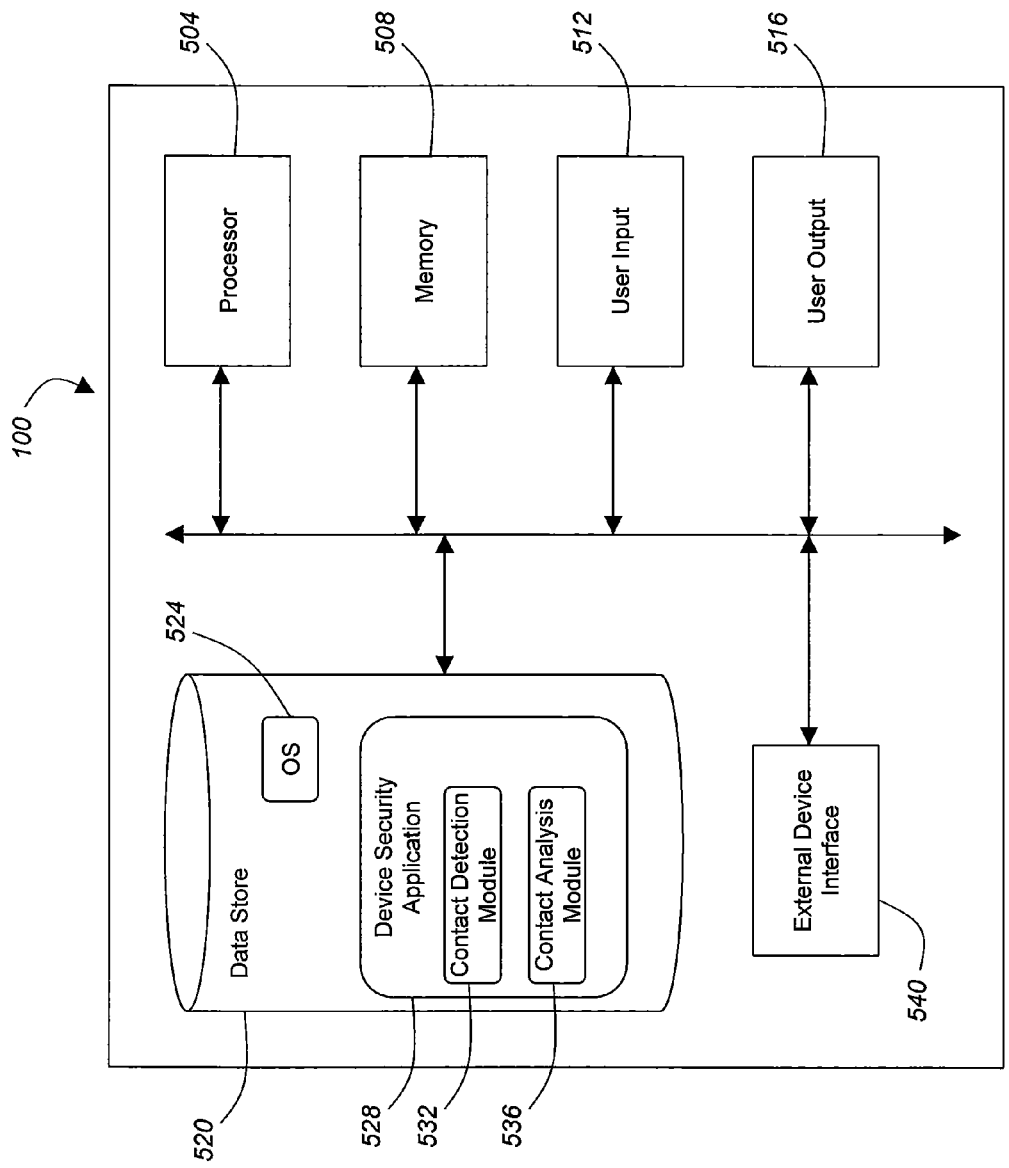
FIG. 5 is a block diagram depicting components of a portable electronic device in accordance with at least some embodiments of the present invention.

With reference now to FIG. 5, components of a portable electronic device 100, such as a communications or computing device, are depicted in block diagram form in accordance with embodiments of the present invention. The components may include a processor 504 capable of executing program instructions. Accordingly, the processor 504 may include any general-purpose programmable processor, digital signal processor (DSP) or controller for executing application programming. Alternatively, the processor 504 may comprise a specially configured application specific integrated circuit (ASIC). The processor 504 generally functions to run programming code implementing various functions performed by the electronic device 100.

An electronic device 100 may additionally include memory 508 for use in connection with the execution of programming by the processor 504 and for the temporary or long-term storage of data or program instructions. The memory 508 may comprise solid-state memory resident, removable or remote in nature, such as DRAM and SDRAM. Where the processor 504 comprises a controller, the memory 508 may be integral to the processor 504. The memory 508 may be volatile and/or non-volatile memory.

In addition, the electronic device 100 may include one or more user inputs 512 and one or more user outputs 516. As noted above, the user inputs 512 may include the touch-screen 104 and/or keys of the keypad 108. The touch-screen 104 may also comprise the user output 516. Additional examples of user inputs 512 include, without limitation, keyboards, mouse controllers, and microphones. Additional examples of user outputs 516 include, but are not limited to, speakers, display screens, and indicator lights.

Furthermore, it can be appreciated by one of skill in the art that the user input 512 may be combined or operated in conjunction with a user output 516. An example of such an integrated user input 512 and user output 516 is a touch-screen 104 display that can both present visual information to a user and receive input selections from a user.

An electronic device 100 may also include data storage 520 for the storage of application programming and/or data. In addition, operating system software 524 may be stored in the data storage 520. The data storage 520 may comprise, for example, a magnetic storage device, a solid state storage device, an optical storage device, a logic circuit, or any combination of such devices. It should further be appreciated that the programs and data that may be maintained in the data storage 520 can comprise software, firmware or hardware logic, depending on the particular implementation of the data storage 520.

The data storage 520 may further include a device security application 528. The device security application 528 may be used to ensure that the electronic device 100, the operation of the processor 504, and access to applications 520 are limited to only validated users. In accordance with at least some embodiments of the present invention, the device security application 528 may comprise a contact detection module 532 and a contact analysis module 536. The contact detection module 532 may be a module specific to the device security application 528 that is operable to recognize when the touch-screen comprises one or more contact points 404. In accordance with at least some embodiments of the present invention, the contact detection module 532 may be adapted to recognize the location of a plurality of contact points 404 simultaneously by determining what contact sensitive elements of the touch-screen 104 are currently being touched. Although the contact detection module 532 is depicted as being within the device security application 528, the device security application 528 may also be operable to access and borrow the functionality of a more general contact detection drive stored on the data store 520. Such general contact detection drives may be used by the operating system software to provide functionality to other applications.

The contact analysis module 536 may be operable to work in concert with the contact detection module 532 to determine if a valid key 200, 300 has been presented to the touch-screen 104. The contact analysis module 536 may be operable to determine which contact sensing elements have been contacted and determine if such simultaneous contact of the elements corresponds to a valid presentation of a key 200, 300. The contact analysis module 536 may be adapted to determine the distance between each contact point 404 as well as the relative angles created between three or more contact points 404. The contact analysis module 536 may be able to determine based on the calculated distances and angles between contact points 404 whether or not the user has presented a valid key 200, 300 to the touch-screen 104.

As can be appreciated by one skilled in the art, key information (e.g., location information based on contact points 404) can be associated with an existing username and password. This is particularly useful in multi-user environments where a plurality of users have access to the same electronic device and some of those users should have different access permissions. For example, a user may be able to associate key information for a key they are carrying with their existing application and/or operating system username and password. This way the user can still be prompted to enter a new password whenever a password expires regardless of whether the user used the sign-in key or a keyboard/stylus to log in. A newly entered password can then be associated with the username and password and disassociated with the old password. By associating the sign-in key to an existing username on the system, the user can be automatically granted access to the same set of applications on the electronic device, regardless of how the user logs into the system.

The electronic device 100 may also include one or more external device interfaces 540. Examples of interfaces 540 include, but are not limited to, a network interface card, a modem, a wired telephony port, a serial or parallel data port, radio frequency broadcast transceiver, a USB port, or other wired or wireless communication network interfaces.

Figure 6:
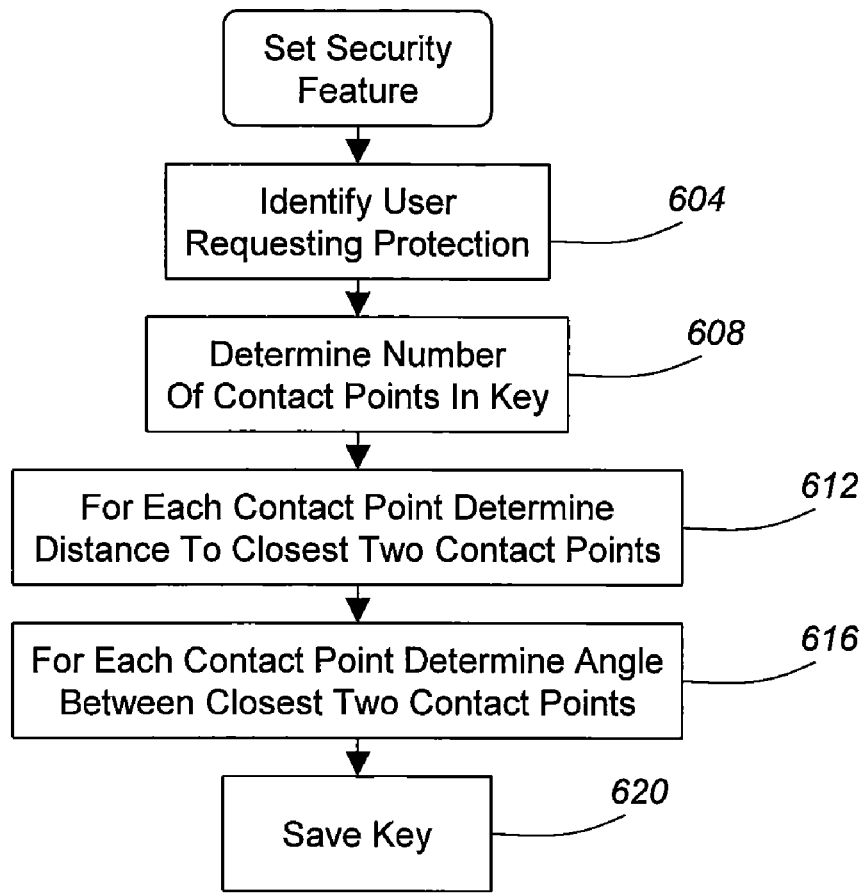
FIG. 6 is a flow diagram depicting a method of setting security features of a portable electronic device in accordance with at least some embodiments of the present invention.

Referring now to FIG. 6, a method of initializing security features of the electronic device 100 will be described in accordance with at least some embodiments of the present invention. The method begins by identifying a user that is requesting protection of an electronic device 100 (step 604). The step of identifying a user and the user's information is useful in situations where there are more than one user allowed to use and/or access a particular electronic device 100. The information retrieved during this identification step may include the user name, employee number, access credentials, and the like. The user then presents a key 200, 300 to the touch-screen 104 of the electronic device 100 that the user would like to use when signing back in to the electronic device 100.

After the user has been identified and presented the key 200, 300 to the touch-screen 104, the method continues with the device security application 528 employing the contact detection module 532 and contact analysis module 536 to determine the number of contact points 404 on the touch-screen 104 (step 608). In this step, the contact detection module 532 determines which contact detecting elements have been contacted by the contactors 208, 308 of a key 200, 300. The contact detection module 532 identifies the number of contact detection elements that have been activated by a contactor 208, 308.

Once the number of contact points 404 have been determined, the method continues with the contact analysis module 536 determining, for each contact point 404, the distance to the closest two contact points 404 (step 612). A valid key 200, 300 may be defined for each contact point 404 based on the two closest contact points 404 to that contact point 404.

The contact analysis module 536 may then determine, for each contact point 404, the relative angle created between the contact point 404 under inspection and the two closest contact points 404 (step 616). In addition to a key 200, 300 being defined by the distance between contact points 404, a key 200, 300 may also be defined by the relative angles created between a contact point 404 and the two closest contact points 404. The angle measured may be the angle created with the contact point 404 of interest as the vertex connecting the other two closest contact points 404. The angle created between the contact points 404 may be any value less than or equal to 180 degrees. Alternatively, the angle may be defined as any value greater than or equal to 180 degrees.

After the distances and angles have been determined for each contact point 404, the device security application 528 may save the key information so that a user can present the same key 200, 300 at a later point-in-time and access the electronic device 100 (step 620). In this step, the device security application 528 may store the determined distances and relative angles for each contact point 404. These determined distances and relative angles may be used to recognize when the same key 200, 300 is presented at a later time. The key information may also be stored with the identified user information to define what applications and/or preferences the electronic device 100 will provide the user when the key 200, 300 is pressed to the touch-screen 104.

Figure 7:
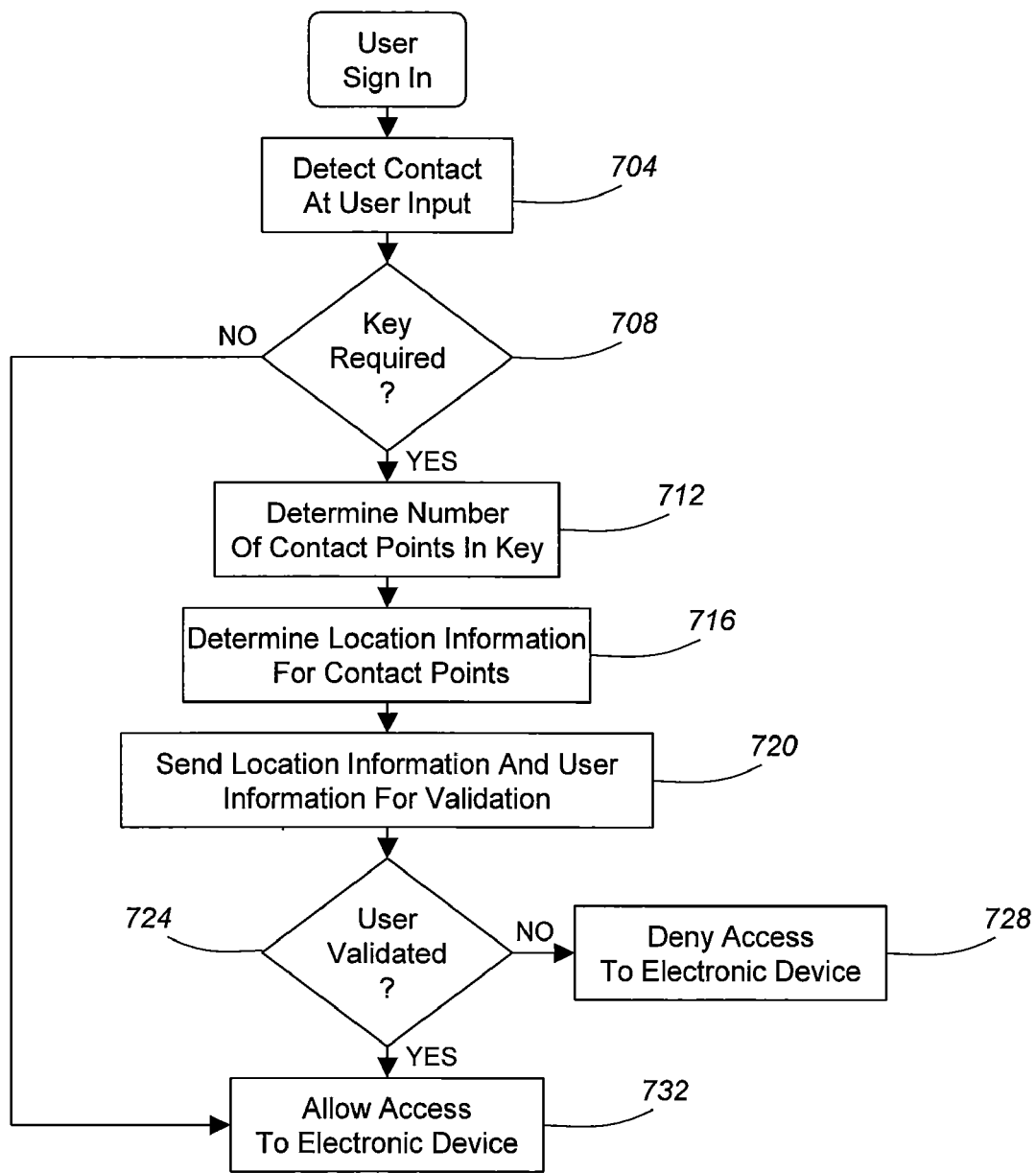
FIG. 7 is a flow diagram depicting a method of accessing a portable electronic device in accordance with at least some embodiments of the present invention.

With reference now to FIG. 7, a method of completing a user sign-in process will be described in accordance with at least some embodiments of the present invention. The method is initiated when the contact detection module 532 detects at least one point of contact at the user input 512 (step 704). In response to detecting the contact, the device security application 528 determines whether a valid key is required to be presented to the touch-screen 104 prior to allowing the user access to the electronic device 100 and/or applications stored thereon (step 708). In other words, the device security application 528 determines whether the electronic device 100 is under password/key protection. Device security is generally desirable in circumstances where the electronic device 100 contains some amount of sensitive information or if the owner/user of the electronic device 100 wants to prevent a potential thief of the electronic device 100 from being able to use it.

If a key is not required, then the device security application 528 allows the user to access the electronic device 100 and the user may utilize the electronic device 100 in the normal fashion (step 732). On the other hand, if there is some security desired for the electronic device 100 and a key is required to be presented before the user can access the electronic device 100, then the method continues with the device security application 528 employing the contact detection module 532 to determine the number of contact points 404 on the touch-screen 104 (step 712). This step is similar to step 608 described in connection with FIG. 6.

After the contact detection module 532 has determined the number of contact points 404 detected, it can access the stored key information to determine which, if any, keys have the same number of contact points 404. The contact analysis module 536 can then analyze the key 200, 300 currently being presented with only those keys identified as having the same number of contact points 404. The contact analysis module 536 continues by determining the location information for each contact point 404 (step 716). More specifically, the contact analysis module 536 determines when contact detecting elements in the touch-screen 104 have been contacted by a contactor 208, 308. In determining the location information, the contact analysis module 536 can determine, for each contact point 404, the distance to the closest two contact points 404 as well as the relative angle created there between. This location information for the key 200, 300 is useful because it neither depends upon the location of the contact area 400 in the touch-screen 104 nor the rotational orientation of the key 200, 300 on the touch-screen 104. Accordingly, the key information may be defined by the relative distances and angles created within the contact area 400, thereby making use of the key 200, 300 more user friendly.

Once the contact analysis module 536 has determined the necessary location information for the key 200, 300 currently being presented to the touch-screen 104, the location information is compared to the stored key information to determine if there are any matches between the currently presented key 200, 300 and any validated keys. The comparison between the contact point distances and relative angles helps to make the determination as to whether or not the key 200, 300 is recognized by the electronic device 100. If a match is found, then the relevant user information and key information is transferred from the contact analysis module to the device security application 528 (step 720). The device security application 528 then analyzes the key location information as well as the user information to determine if the key 200, 300 and its associated user are allowed access to the electronic device 100 and/or applications stored thereon (step 724). If the user is not validated, based either on the user information or the lack of having presented a valid key 200, 300, then the device security application 528 denies the user access to the electronic device 100 (step 728). Alternatively, if the device security application 528 validates the user and the key 200, 300 presented to the touch-screen 104 as a valid key, then the user is allowed access to the electronic device 100 (step 732). In accordance with at least some embodiments of the present invention, the device security application 528 may determine what applications the user is allowed access to based on the key 200, 300 presented and/or the user information. This way a plurality of users can be allowed general access to an electronic device 100 while only specified users are allowed access to certain sensitive information and/or applications.

As can be appreciated by one skilled in the art, although specific methods and algorithms have been described for determining key information based on the location of contact points 404 on a touch-screen 104 (e.g., via distance and angle calculations for near contact points 404), other known pattern recognition methods can be employed to determine key information and further determine whether a valid key has been presented to a touch-screen 104 based on the relative location of contact points 404.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The security systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for maintaining the security of portable electronic devices. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
    providing a sign-in key having a plurality of spatially dislocated contactors;
    simultaneously detecting a plurality of contact points on a touch-screen of an electronic device, the plurality of contact points being points of contact between the contactors and the touch-screen and corresponding to contact sensing elements of the touch-screen that have been activated by the contactors;
    analyzing the plurality of contact points;
    determining key information based on the analysis of the plurality of contact points; and
    making a determination to admit or deny a user access to the electronic device based on the determined key information.

2. The method of claim 1, wherein the determining key information comprises determining a number of contact points in the plurality of contact points, and wherein the making a determination to admit or deny comprises comparing the number of contact points in the plurality of contact points to a number of contact points for each key in a list of valid keys.

3. The method of claim 1, wherein determining key information further comprises:
    for a first contact point in the plurality of contact points, determining a distance to a second contact point and a distance to a third contact point;
    for the first contact point in the plurality of contact points, determining an angle created between the first, second, and third contact points, wherein the angle is determined with the first contact point as the vertex; and
    comparing the determined distance and angle information for the first contact point with distance and angle information for contact points in keys in a list of valid keys.

4. The method of claim 3, wherein the second and third contact points are the closest contact points to the first contact point.

5. The method of claim 1, wherein the user is permitted access to less than all of the applications provided by the electronic device.

6. A computer readable medium comprising non-transitory processor executable instructions operable to perform the method of claim 1.

7. An electronic device, comprising:
    a touch-screen comprising a plurality of contact detecting elements operable to detect and differentiate between simultaneous contacts at different contact detecting elements; and
    a device security application comprising a contact analysis module operable to analyze the contact detecting elements that have been contacted by contactors of a sign-in key, determine key information based on the contacted elements, and make a determination to admit or deny a user access to the electronic device based on the determined key information.

8. The device of claim 7, further comprising a first and second application, wherein the device security application is operable to admit the user access to the first application and deny the user access to the second application.

9. The device of claim 7, wherein the activated contact detecting elements are arranged in a contact area, wherein the device security application is operable to make the determination to admit or deny a user access regardless of location and rotational orientation of the contacted elements on the touch-screen.

10. The device of claim 7, wherein the contact analysis module is operable to determine key information by determining a number of contact points in the plurality of contact points, and wherein the device security application is operable to make a determination to admit or deny comprises comparing the number of contact points in the plurality of contact points to a number of contact points for each key in a list of valid keys.

11. The device of claim 10, wherein the contact analysis module is further operable to determine key information by determining, for a first contact point in the plurality of contact points, a distance to a second contact point and a distance to a third contact point, as well as determining, for the first contact point in the plurality of contact points, an angle created between the first, second, and third contact points, wherein the angle is determined with the first contact point as the vertex, and compare the determined distance and angle information for the first contact point with distance and angle information for contact points in keys in a list of valid keys.

12. The device of claim 11, wherein the second and third contact points are the closest contact points to the first contact point.

13. A security system, comprising:
    a sign-in key comprising a plurality of spatially dislocated contactors; and
    an electronic device comprising (i) a touch-screen having a plurality of contact sensitive elements operable to detect and differentiate between the contactors, and (ii) a device security application comprising a contact analysis module operable to analyze the contact detecting elements that have been contacted by the contactors, determine key information based on the contacted elements, and make a determination to admit or deny a user access to the electronic device based on the determined key information.

14. The device of claim 13, wherein the electronic device further comprises a first and second application, wherein the device security application is operable to admit the user access to the first application and deny the user access to the second application.

15. The device of claim 13, wherein the device security application is operable to make the determination to admit or deny a user access regardless of the location where the sign-in key is presented to the touch-screen.

16. The device of claim 13, wherein the device security application is operable to make the determination to admit or deny a user access regardless of the rotational orientation of the sign-in key with respect to the touch-screen.

17. The device of claim 13, wherein the contact analysis module is operable to determine key information by determining a number of contact points in the plurality of contact points, and wherein the device security application is operable to make a determination to admit or deny comprises comparing the number of contact points in the plurality of contact points to a number of contact points for each key in a list of valid keys.

18. A method, comprising:
providing a sign-in key having a plurality of spatially dislocated contactors;
simultaneously detecting a plurality of contact points on a touch-screen of an electronic device, the plurality of contact points being points of contact between the contactors and the touch-screen and corresponding to contact sensing elements of the touch-screen that have been activated by the contactors;
analyzing the plurality of contact points;
determining key information based on the analysis of the plurality of contact points; and
making a determination to admit or deny a user access to the electronic device based on the determined key information;
wherein determining key information further comprises:
for a first contact point in the plurality of contact points, determining a distance to a second contact point in the plurality of contact points, and a distance to a third contact point in the plurality of contact points, wherein the second and third contact points are the closest contact points to the first contact point;
for the first contact point in the plurality of contact points, determining an angle created between the first, second, and third contact points, wherein the angle is determined with the first contact point as the vertex;
comparing the determined distance and angle information for the first contact point with distance and angle information for contact points in keys in a list of valid keys;
for the second contact point in the plurality of contact points, determining a distance to a fourth contact point in the plurality of contact points, and a distance to a fifth contact point in the plurality of contact points;
for the second contact point in the plurality of contact points, determining an angle created between the second, fourth, and fifth contact points; and
comparing the determined distance and angle information for the second contact point with distance and angle information for contact points in keys in a list of valid keys.

19. The method of claim 18, further comprising:
identifying a first key in the list of valid keys that comprises at first and second contact point that comprise the same distance and angle information as the first and second contact points in the plurality of contact points;
determining permissions associated with the first key; and
permitting the user access to the electronic device based on the permissions associated with the first key.

20. An electronic device, comprising:
a touch-screen comprising a plurality of contact detecting elements operable to detect and differentiate between simultaneous contacts at different contact detecting elements; and
a device security application comprising a contact analysis module operable to analyze the contact detecting elements that have been contacted by contactors of a sign-in key, determine key information based on the contacted elements, and make a determination to admit or deny a user access to the electronic device based on the determined key information;
wherein the contact analysis module is operable to determine key information by determining a number of contact points in the plurality of contact points, and wherein the device security application is operable to make a determination to admit or deny comprises comparing the number of contact points in the plurality of contact points to a number of contact points for each key in a list of valid keys;
wherein the contact analysis module is further operable to determine key information by determining, for a first contact point in the plurality of contact points, a distance to a second contact point in the plurality of contact points, and a distance to a third contact point in the plurality of contact points, as well as determining, for the first contact point in the plurality of contact points, an angle created between the first, second, and third contact points, wherein the angle is determined with the first contact point as the vertex, and compare the determined distance and angle information for the first contact point with distance and angle information for contact points in keys in a list of valid keys;
wherein the second and third contact points are the closest contact points to the first contact point; and
wherein the contact analysis module is further operable to determine key information by determining, for the second contact point in the plurality of contact points, a distance to a fourth contact point in the plurality of contact points, and a distance to a fifth contact point in the plurality of contact points, as well as determining, for the second contact point in the plurality of contact points, an angle created between the second, fourth, and fifth contact points, and compare the determined distance and angle information for the second contact point with distance and angle information for contact points in keys in a list of valid keys.

21. The device of claim 20, wherein the device security application is further operable to identify a first key in the list of valid keys that comprises at first and second contact point that comprise the same distance and angle information as the first and second contact points in the plurality of contact points, determine permissions associated with the first key, and permit the user access to the electronic device based on the permissions associated with the first key.

* * * * *